(12) United States Patent
Proudfoot

(10) Patent No.: US 9,841,009 B2
(45) Date of Patent: Dec. 12, 2017

(54) HYBRID POWER SYSTEM

(71) Applicant: Northrop Grumman Systems Corporation, Falls Church, VA (US)

(72) Inventor: Lewis S. Proudfoot, Annandale, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 203 days.

(21) Appl. No.: 14/810,642

(22) Filed: Jul. 28, 2015

(65) Prior Publication Data
US 2017/0030339 A1    Feb. 2, 2017

(51) Int. Cl.
| | |
|---|---|
| *F03G 7/00* | (2006.01) |
| *F03G 6/06* | (2006.01) |
| *F02G 1/043* | (2006.01) |
| *F25B 9/14* | (2006.01) |
| *F01K 3/18* | (2006.01) |

(52) U.S. Cl.
CPC .............. *F03G 7/00* (2013.01); *F01K 3/188* (2013.01); *F02G 1/043* (2013.01); *F03G 6/068* (2013.01); *F25B 9/14* (2013.01); *F02G 2243/00* (2013.01); *F02G 2243/50* (2013.01); *F02G 2243/54* (2013.01); *F25B 2309/1404* (2013.01); *F25B 2309/1428* (2013.01); *Y02E 10/40* (2013.01); *Y02E 10/46* (2013.01)

(58) Field of Classification Search
CPC .... F03G 7/00; F03G 6/068; F25B 9/14; F25B 2309/1428; F25B 2309/1404; F02G 1/043; F02G 2243/54; F02G 2243/00; F02G 2243/50; Y02E 10/40

USPC ........................................... 60/517–526; 62/6
See application file for complete search history.

(56) References Cited

U.S. PATENT DOCUMENTS 6,490,881 B1 * 12/2002 Sinclair .................. F01B 11/08
                                                                      60/545
7,143,586 B2   12/2006 Smith et al.
(Continued)

FOREIGN PATENT DOCUMENTS

| CN | 101256040 | 9/2008 |
| CN | 103401472 | 11/2013 |

(Continued)

OTHER PUBLICATIONS

Immovilli, F. et al; Solar Trigeneration for Residential Applications, a Feasible Alternative to Traditional Micro-Cogeneration and Trigeneration Plants; Industry Applications Society Annual Meeting, 2008. IAS '08. IEEE, pp. 1-8; Oct. 5-9, 2008.

(Continued)

*Primary Examiner* — Hoang Nguyen
(74) *Attorney, Agent, or Firm* — Patti & Malvone Law Group, LLC

(57) ABSTRACT

Heat from a safe high energy density fuel, such as aluminum, is used to generate electrical power. In some applications, the fuel may use seawater as an oxidizer. Additionally, the hybrid power system uses a highly efficient and silent thermoacoustic power converter (TAPC) to convert the thermal energy from the oxidation of aluminum to AC electrical energy. The AC electrical energy is converted to DC energy and stored in a battery. In situations demanding low power, the battery can provide power while the fuel combustion process is suspended.

20 Claims, 3 Drawing Sheets

(56) References Cited

U.S. PATENT DOCUMENTS

| | | | |
|---|---|---|---|
| 7,430,866 | B1 | 10/2008 | Lynch et al. |
| 7,944,118 | B2 | 5/2011 | Peacock |
| 8,656,724 | B2* | 2/2014 | Cawley .................. F01K 21/04 60/39.55 |
| 2003/0182939 | A1* | 10/2003 | Weiland .................. F02C 3/02 60/517 |
| 2006/0048510 | A1* | 3/2006 | White .................. F02G 1/0435 60/520 |
| 2009/0184604 | A1* | 7/2009 | Symko .................. F02G 1/043 310/334 |
| 2010/0212311 | A1* | 8/2010 | McQuary .................. F25B 9/14 60/520 |
| 2011/0100328 | A1* | 5/2011 | Paul .................. C25B 1/04 123/445 |
| 2011/0252800 | A1 | 10/2011 | Cawley et al. |
| 2011/0265505 | A1* | 11/2011 | Schwartz .................. F25B 9/145 62/215 |
| 2011/0289935 | A1 | 12/2011 | Danov |
| 2015/0336024 | A1* | 11/2015 | Zebuhr .................. B01D 1/225 203/10 |

FOREIGN PATENT DOCUMENTS

| | | |
|---|---|---|
| WO | 2014024946 | 2/2014 |
| WO | 2014030368 | 2/2014 |

OTHER PUBLICATIONS

Green Car Congress Blog Post; Startup commercializing thermoacoustic Stirling technology for combined heat and power for homes; Published Dec. 27, 2013, downloaded Oct. 6, 2014 http://www.greencarcongress.com/2013/12/20131227-taps.html.

Smith, A. et al; Analysis of hybrid fuel-cell/stirling-engine systems for domestic combined heat and power; Energytech, 2012 IEEE, pp. 1-7; May 29-31, 2012; 978-1-4673-1835-8/12.

Anatone, M. et al; Integration of CCHP and solar plants for household applications, a multiobjective optimization model; Renewable Energy Research and Applications (ICRERA), 2013 International Conference on, pp. 499-504; Oct. 20-23, 2013; 978-1-4799-1464-7/13; IEEE 2013.

Buckmaster, D.J. et al; Analysis of a stirling-cycle power convertor for domestic combined heat and power; Energytech, 2011 IEEE, pp. 1-6; May 25-26, 2011; 978-1-4577-0776-6/11.

Shen, C. et al; Performance of solar powered thermoacoustic engine at different tilted angles; Applied Thermal Engineering, vol. 29, Issue 13, Sep. 2009, pp. 2745-2756, ISSN 1359-4311, (http://www.sciencedirect.com/science/article/pii/S1359431109000209); doi:10.1016/j.applthermaleng.2009.01.008.

Wu, Z. et al; A solar-powered traveling-wave thermoacoustic electricity generator; Solar Energy, vol. 86, Issue 9, Sep. 2012; pp. 2376-2382, ISSN 0038-092X; (http://www.sciencedirect.com/science/article/pii/S0038092X1200179X); 2012 Elsevier Ltd.

Wu, Z. et al; Investigation on a 1 kW traveling-wave thermoacoustic electrical generator; Applied Energy, vol. 124, Jul. 1, 2014, pp. 140-147, ISSN 0306-2619; 2014 Elsevier Ltd.

Telesz, M. P.; Design and Testing of a Thermoacoustic Power Converter; Thesis at Georgia Institute of Technology, Aug. 2006, http://hdl.handle.net/1853/11495.

Adinoli, G. et al; Grid integration of distributed energy resources: Technologies, potentials contributions and future prospects; Clean Electrical Power (ICCEP), 2013 International Conference on, pp. 509-515; Jun. 11-13, 2013; 978-1-4673-4430-2/13; 2013 IEEE.

Miller, T.F. et al; A next-generation AUV energy system based on aluminum-seawater combustion; Autonomous Underwater Vehicles, 2002. Proceedings of the 2002 Workshop on, pp. 111-119; 2002 IEEE.

* cited by examiner

HYBRID POWER SYSTEM

TECHNICAL FIELD

An embodiment of the present invention relates to the field of energy conversion, more particularly to the field of converting thermal energy to electrical energy.

BACKGROUND

Safe power generation and flexible power storage is desirable in extended power consumption systems for mobile vehicles, especially underwater vehicles. In many applications it is desirable to have high energy density fuels for extended missions. Examples include submarines where safety and silence are important. Generating useful power without coming to the surface is very important. This class of system is usually called "Air Independent Power" or "Air Independent Propulsion"

In the past, vehicle power systems generated too much noise and were relatively inefficient. Additionally, the power systems were not flexible enough to efficiently satisfy a wide dynamic range of power requirements. In these systems, heat from a hydrocarbon fuel's oxidation was used to drive a turbine, which in turn drove a generator to generate electrical energy. The use of hydrocarbon based fuel introduced additional drawbacks. This type of fuel was dangerous due to the potential for explosion, and in underwater applications, the oxidizer was carried on board and thereby limited the space available for fuel. Only nuclear steam plants which are very large, expensive, and requiring highly trained operators, solved these problems for the world's most advanced Navies.

SUMMARY

An embodiment of the present invention provides a hybrid power system that is silent, highly efficient and can address a wide dynamic range of power requirements. It uses heat from a safe high energy density fuel, such as aluminum, to generate electrical power. The fuel uses water as an oxidizer and thereby provides additional fuel storage by freeing up space that was used to store oxidizer. Additionally, the hybrid power system uses a highly efficient and silent thermoacoustic power converter (TAPC) to convert the thermal energy from the oxidation of aluminum to AC electrical energy. The AC electrical energy is either used directly to power the vehicle, or is converted to DC energy and stored in a battery. This embodiment's use of a battery provides power over a wide dynamic range of power requirements. For example, in situations demanding low power, the battery can provide power while the fuel combustion process is suspended. In a period of very high demand, the TAPC can be run in parallel with the battery, generating very high power levels.

In another embodiment of the present invention, an aluminum combustor is thermally connected to a thermoacoustic power converter. The thermoacoustic power converter generates electrical power from the thermal energy received from the aluminum combustor.

In yet another embodiment of the present invention, a heat source is thermally connected to a thermoacoustic power converter. The thermoacoustic power converter generates electrical power from thermal energy received from the heat source using dual alternators. The electrical power obtained from the thermoacoustic power converter is stored in an electrical energy storage device.

In still another embodiment of the present invention, an aluminum combustor is thermally connected to a thermoacoustic power converter. The thermoacoustic power converter generates electrical power from the thermal energy received from the aluminum combustor. A battery stores the electrical power obtained from the thermoacoustic power converter.

DETAILED DESCRIPTION

Figure 1:
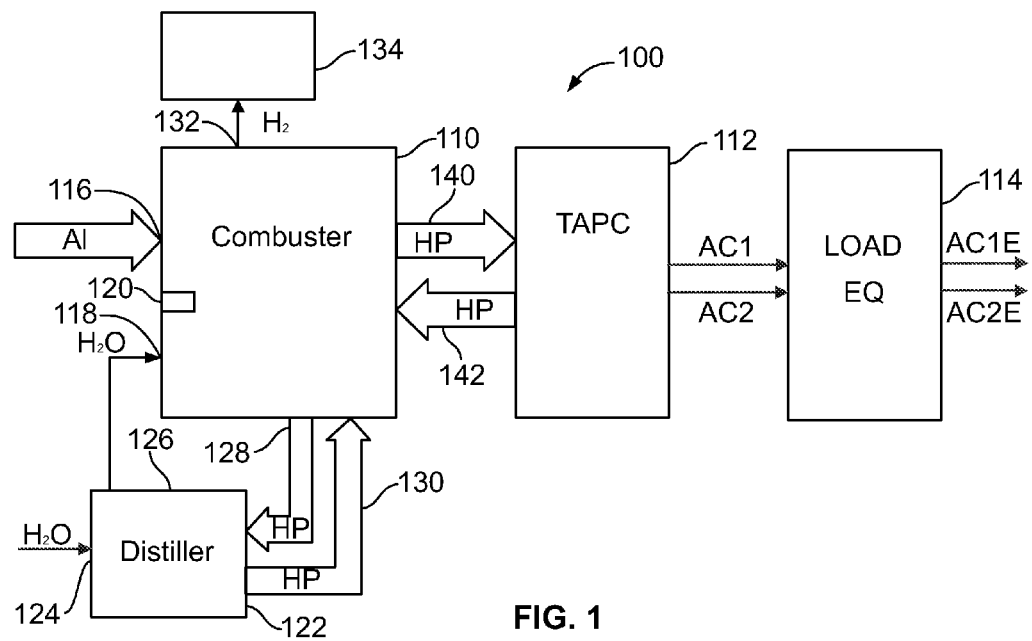
FIG. 1 illustrates an embodiment that includes a distiller and hydrogen capture system.

FIG. 1 illustrates hybrid power system 100. System 100 includes combustor 110, TAPC 112 and load equalizer 114. Combustor 110 generates the thermal energy that is used by TAPC 112.

Combustor 110 oxidizes aluminum received at input 116 using water received at input 118. The oxygen in the water is the oxidizer that is used to combust the aluminum to produce aluminum oxide and thermal energy. The combustion process is started through the use of plasma jet 120. The combustion may be implemented within a temperature range of approximately 3400° C. and 900° C., and a pressure range of approximately 200 to 300 psi. In underwater applications, the source of water to input 118 may be seawater. It is also possible to include distiller 122 to remove salt or other contaminants from the water. Distiller 122 may receive water at input 124 and provide distilled water to combustor 110 via output 126. The thermal energy is provided to distiller 122 via heat pipes 128 and 130. Heat pipes 128 and 130 may contain phase change materials or liquid salts to convey the thermal energy from combustor 110 to distiller 122. In this example, the liquid salt flows from combustor 110 to distiller 122 via heat pipe 128 and returns to combustor 110 via heat pipe 130. The oxidation or combustion process produces hydrogen gas as byproduct. The hydrogen gas is removed from the combustor by output 132, and can be stored for later processing, or vented directly to the external environment. The hydrogen gas may be simply vented to the atmosphere or to the water in underwater applications. It is also possible use hydrogen capture system 134 to make use of the hydrogen byproduct. Hydrogen capture system 134 may be, for example, a tank to hold the hydrogen, a material that absorbs hydrogen for later release, or a fuel cell that can be used to produce additional electrical energy.

Heat pipes 140 and 142 are used to conduct thermal energy from combustor 110 to TAPC 112. Heat pipes 140 and 142 may contain phase change materials or liquid salts to convey thermal energy from combustor 110 to TAPC 112. In this example, the liquid salt flows from combustor 110 to TAPC 112 using heat pipe 140 and returns from TAPC 112 to combustor 110 using heat pipe 142.

TAPC 112 uses thermal energy received from combustor 110 to cause a gas, such as helium, contained within the TAPC to expand and contract in an oscillatory fashion. As the gas expands and contracts, it drives flexible membranes that are attached to magnets. The oscillatory expansion and contraction of the helium gas causes the flexible membranes and their attached magnets to oscillate within a wire coil to generate AC power. In this embodiment, there are two sets of flexible membranes, magnets and coils to produce AC outputs AC1 and AC2. These assemblies are set in opposing motion, greatly reducing noise and vibration.

Outputs AC1 and AC2 are provided to load equalizer 114. Load equalizer 114 load balances each of TAPC outputs AC1 and AC2 using adjustable reactive shunt loads. The output impedance of each TAPC output is matched to the load impedance seen by each output. Equalized outputs AC1E and AC2E are then available for use or storage. It should be noted that by equalizing the outputs from TAPC 112, vibrational noise generated by TAPC 112 is minimized. This is desirable in underwater applications where silence is important. The reduction in vibration also increases reliability and lifespan of the system.

Figure 2A:
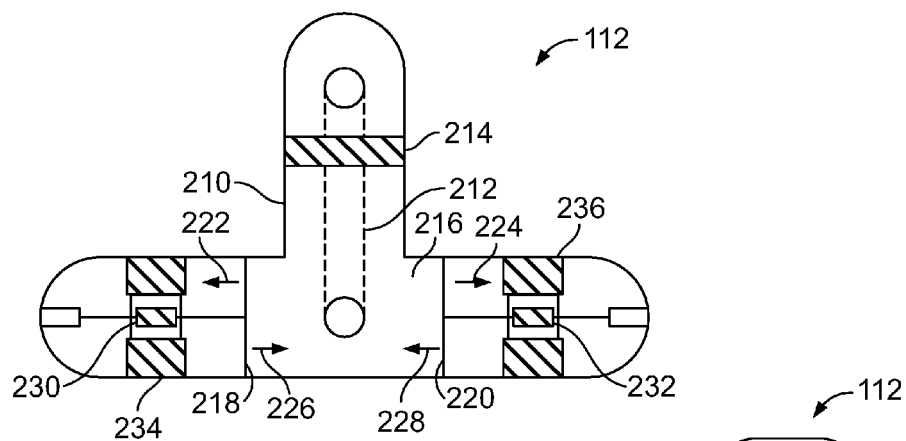
FIGS. 2A and 2B illustrate a TAPC.
Figure 2B:
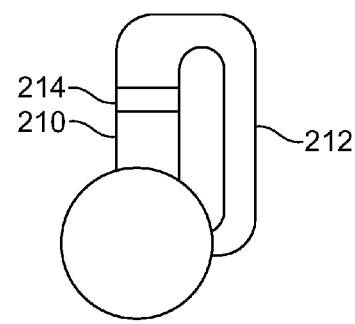

FIGS. 2A and 2B illustrate an embodiment of TAPC 112. FIG. 2A is a cross-section of TAPC 112 and FIG. 2B is a side view of TAPC 112. TAPC 112 may be implemented using other well-known thermoacoustic power converters; however, in this embodiment a dual alternator TAPC is used. TAPC 112 includes thermal buffer tube 210 and inertance tube 212. Positioned between tube 212 and tube 210 is heat exchanger 214. Heat exchanger 214 receives thermal energy from combustor 110 through heat pipes 140 and 142. Tubes 210, 212 and working volume 216 are filled with a working gas such as helium gas. Heat from heat exchanger 214 heats the helium gas and causes it to expand, which drives membranes 218 and 220 in the direction of arrows 222 and 224, respectively. The expansion of the gas causes a cooling which results in the gas contracting which then allows membranes 218 and 220 to move in the direction of arrows 226 and 228, respectively. This motion causes magnets 230 and 232 to oscillate within wire coils 234 and 236, respectively. This oscillatory motion produces the AC current that is provided from TAPC 112 to load equalizer 114. The combination of membrane, magnet and wire coil may be viewed as an alternator. It should be noted that the movement of the alternators expands the working fluid, cooling it, generating the resonance needed to drive the TAPC. It should also be noted that the alternators are arranged opposed to each other, which helps to minimize vibrational noise.

Figure 3:
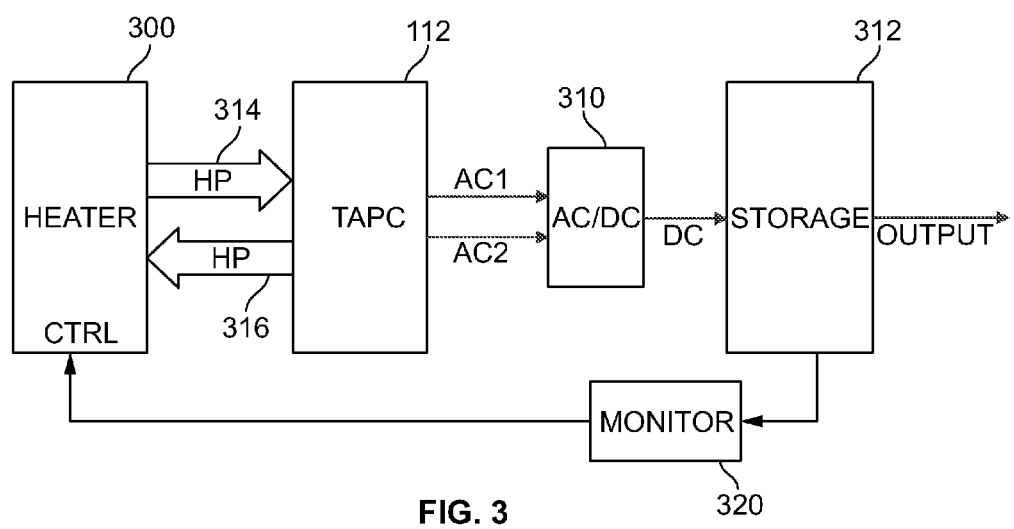
FIG. 3 illustrates an embodiment that includes an energy storage unit.

FIG. 3 illustrates an embodiment that includes an energy storage unit. Heater 300 provides thermal energy to TAPC 112, which provides AC power to AC to DC converter 310. AC to DC converter 310 provides DC power to storage unit 312.

Heater 300 may be a combustor such as combustor 110 which oxidizes aluminum or it may be used in some applications to combust or oxidize hydrocarbons. It is also possible to implement heater 300 as a collector of solar energy. The thermal energy from heater 300 is conveyed to TAPC 112 using heat pipes 314 and 316. Heat pipes 314 and 316 may contain phase change materials or liquid salts to convey thermal energy from heater 300 to TAPC 112. In this example, the liquid salt flows from heater 300 to TAPC 112 using heat pipe 314 and returns from TAPC 112 to heater 300 using heat pipe 316.

TAPC 112 provides AC power to AC to DC converter 310. AC to DC converter 310 converts the two AC outputs from TAPC 112 into DC power, which is provided to storage unit 312. Storage unit 312 may be implemented using embodiments such as a capacitor, and/or batteries such as lithium-ion batteries or zinc-air batteries.

Monitor 320 monitors the level of charge within storage unit 312. By monitoring the charge stored within storage unit 312, it is possible to control heater 300 so that the heating process can be suspended when additional electrical energy is not required or cannot be stored within storage unit 312. Suspending the heating process when additional electrical energy is not required conserves fuel.

It should be noted that in order to minimize vibration produced by TAPC 112 a load equalizer 114 maybe placed between TAPC 112 and AC to DC converter 310.

Figure 4:
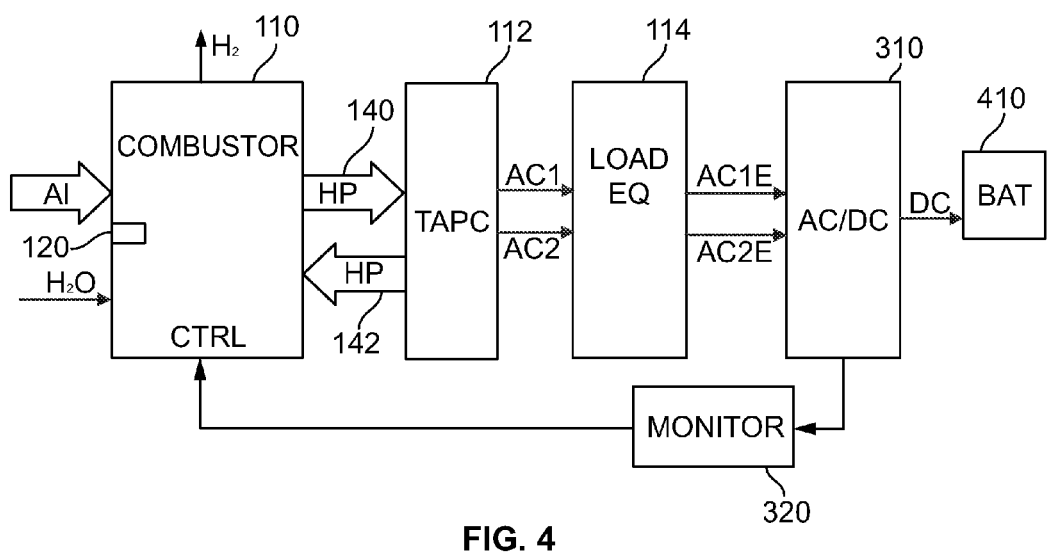
FIG. 4 illustrates an embodiment that includes a battery.

FIG. 4 illustrates an embodiment that includes an aluminum combustor and a battery. Aluminum combustor 110 provides thermal energy to TAPC 112 using heat pipes 140 and 142. The two AC outputs from TAPC 112 are provided to load equalizer 114. The AC outputs from load equalizer 114 are provided to AC to DC converter 310, which provides DC electrical energy to battery 410 for storage. Battery 410 may be implemented using batteries such as lithium-ion batteries or zinc-air batteries. The charge level of battery 410 is monitored by monitor 320, which is used to control combustor 110. Monitor 320 suspends the combustion process when additional electrical energy is not required or cannot be stored within battery 410. Suspending the combustion process when system power requirements can be met by the energy stored within battery 410 conserves the fuel used by combustor 110. It is possible for hysteresis to be built in to the operation of monitor 320. For example, monitor 320 may activate combustor 110 when battery 410 has a voltage of less than 10 V and will deactivate combustor 110 when battery 410 has a voltage greater than 12 V.

It should be noted that the embodiment a FIG. 4 may include distiller 122 and its associated thermal connections to combustor 110, and it may also include hydrogen capture system 134.

Figure 5:
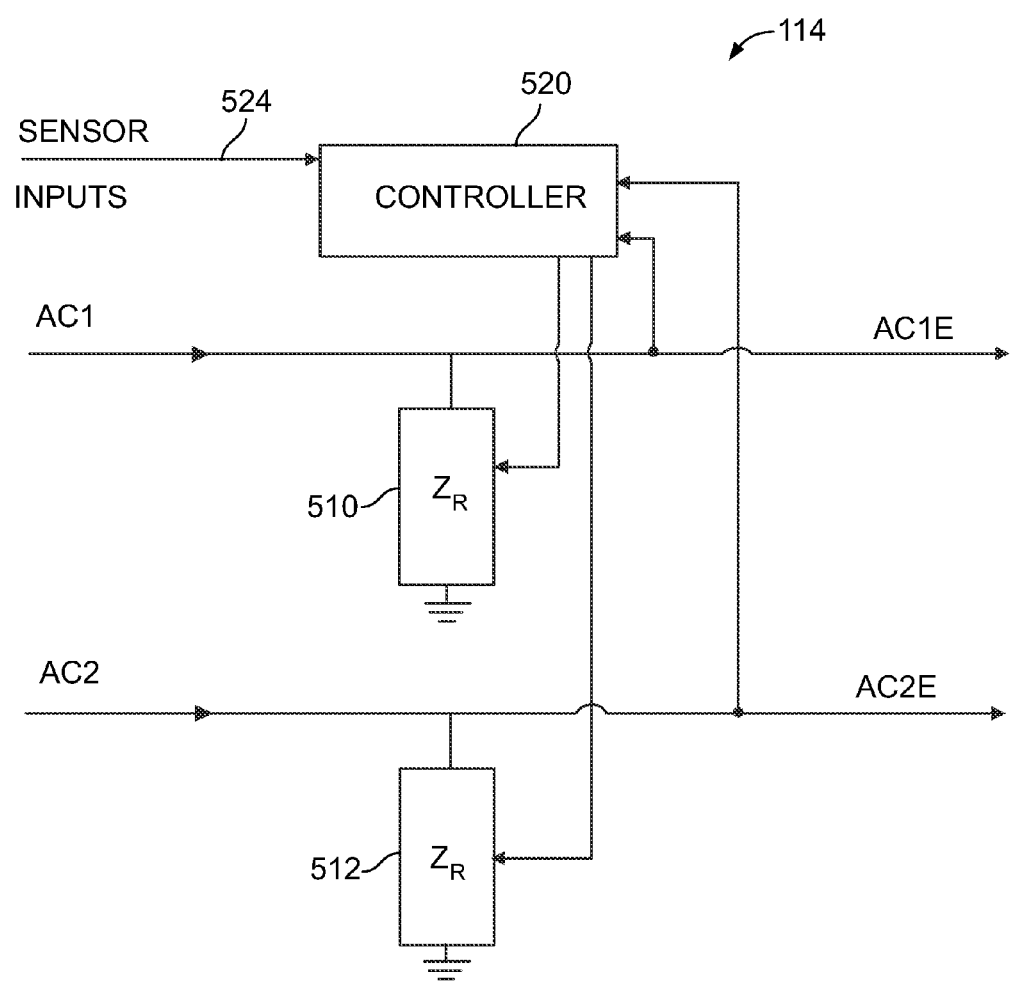
FIG. 5 illustrates a load equalizer.

FIG. 5 illustrates an example of an embodiment of load equalizer 114. Each of TAPC outputs AC1 and AC2 are connected to adjustable reactive shunt load 510 and 512, respectively. Each of TAPC outputs AC1 and AC2 are load balanced using the adjustable reactive shunt loads. The output impedance of TAPC output AC1 is matched to the load impedance seen by output AC1E by adjusting reactive shunt load 510. Likewise, the output impedance of TAPC output AC2 is matched to the load impedance seen by output AC2E by adjusting reactive shunt load 512. Controller 520 matches the output impedance to the load impedance by monitoring the current and voltage on output AC1E, and then by adjusting reactive shunt load 510 to maximize the power transfer to the load seen by output AC1E. Likewise, controller 520 matches the output impedance to the load impedance by monitoring the current and voltage on output AC2E, and then by adjusting reactive shunt load 512 to maximize the power transfer to the load seen by output AC2E. Controller 520 may be implemented, for example, using a programmable processor or computer that executes a program stored in a memory or other non-transitory medium.

Controller 520 operates in real time in order to compensate for variations in load impedance that may occur as a result of changing conditions such as changes in power demands, number of loads or changes in temperature. By managing the reactive loads, controller 520 minimizes system noise and vibration, and maximizes overall efficiency.

In another embodiment, it is also possible to minimize system noise and vibration, and increase overall efficiency by providing sensor input 524 to controller 520. Sensor input 524 may include information such as a vibration level of TAPC 112, the temperature of the working fluid within TAPC 112, or other parameters. For example, as the vibration level increases, controller 520 may incrementally change the reactive shunt loads to decrease the vibration. Controller 520 may use a search algorithm to minimize the vibration by, for example, increasing the reactive shunt loads by 0.01% and then determining if the vibration decreases, if it decreases, controller 520 will continue to incrementally increase the reactive shunt loads in order to minimize vibration. If increasing the reactive shunt loads causes vibration to increase, controller 520 will incrementally decrease the reactive shunt loads in order to minimize vibration. Controller 520 may act in a similar manner when sensor input 524 indicates an increase in the temperature of the working fluid within TAPC 112. In this case, for example, the search algorithm may start by incrementally decreasing the reactive shunt loads by 0.01% and then determining if the temperature decreases, if it decreases, controller 520 will continue to incrementally decrease the reactive shunt loads in order to minimize the temperature. If decreasing the reactive shunt loads causes the temperature to increase, controller 520 will incrementally increase the reactive shunt loads in order to decrease the temperature. It is possible to use other algorithms to adjust the reactive shunt loads, and it is also possible to adjust the reactive shunt loads in parallel or individually when minimizing the vibration or temperature.

The methods or functions described hereinabove may be executed through the use of dedicated hardware as well as hardware capable of executing software in association with appropriate software. When provided by a processor or controller, the corresponding methods or functions may be provided by a single dedicated processor or controller, by a single shared processor or controller, or by a plurality of individual processors or controllers, some of which may be shared. Processors or controllers may be implemented as hardware capable of executing software, and may also be implemented using devices that include, for example and without limitation, digital signal processor (DSP) hardware, network processor, application specific integrated circuit (ASIC), field programmable gate array (FPGA), operation specific hardware such as multipliers or adders, read-only memory (ROM) for storing software, random access memory (RAM), and non-volatile storage.

What is claimed is:

1. An apparatus, comprising:
   an aluminum combustor; and
   a thermoacoustic power converter thermally connected to the aluminum combustor, the thermoacoustic power converter generating electrical power from thermal energy received from the aluminum combustor using a first and a second flexible membrane, wherein the first and the second flexible membranes move in opposing directions.

2. The apparatus of claim 1, further comprising an AC to DC converter that converts AC power from the thermoacoustic power converter to DC power.

3. The apparatus of claim 1, further comprising a load balancer to equalize AC power produced by first and second outputs of the thermoacoustic power converter.

4. The apparatus of claim 3, further comprising an AC to DC converter that converts AC power from the thermoacoustic power converter to DC power.

5. The apparatus of claim 1, further comprising a distiller that provides water to the aluminum combustor.

6. The apparatus of claim 1, further comprising a hydrogen capture system that receives hydrogen gas from the aluminum combustor.

7. The apparatus of claim 1, further comprising a fuel cell that receives hydrogen gas from the aluminum combustor.

8. An apparatus, comprising:
   a heat source;
   a thermoacoustic power converter thermally connected to the heat source, the thermoacoustic power converter generating electrical power from thermal energy received from the heat source using a first alternator having a first flexible membrane and a second alternator having a second flexible membrane, wherein the first and the second flexible membranes move in opposing directions; and
   an electrical energy storage device that stores electrical power obtained from the thermoacoustic power converter.

9. The apparatus of claim 8, wherein the electrical energy storage device is a battery.

10. The apparatus of claim 8, further comprising an electrical energy storage device monitor that monitors an amount of stored electrical energy and controls the thermal energy received by the thermoacoustic power converter based on the amount of stored electrical energy.

11. The apparatus of claim 8, wherein the heat source is a solar energy collector.

12. The apparatus of claim 8, wherein the heat source is a hydrocarbon combustor.

13. An apparatus, comprising:
    an aluminum combustor;
    a thermoacoustic power converter thermally connected to the aluminum combustor, the thermoacoustic power converter generating electrical power from thermal energy received from the aluminum combustor using a first and a second flexible membrane, wherein the first and the second flexible membranes move in opposing directions; and
    a battery that stores electrical power obtained from the thermoacoustic power converter.

14. The apparatus of claim 13, further comprising a load balancer to equalize AC power produced by first and second outputs of the thermoacoustic power converter.

15. The apparatus of claim 13, further comprising a distiller that provides water to the aluminum combustor.

16. The apparatus of claim 13, further comprising an electrical energy storage device monitor that monitors an amount of stored electrical energy in the battery and controls the thermal energy received by the thermoacoustic power converter based on the amount of stored electrical energy.

17. The apparatus of claim 13, further comprising a hydrogen capture system that receives hydrogen gas from the aluminum combustor.

18. The apparatus of claim 13, further comprising a fuel cell that receives hydrogen gas from the aluminum combustor.

19. The apparatus of claim 13, wherein the battery is a lithium-ion battery.

20. The apparatus of claim 13, wherein the battery is a zinc-air battery.

* * * * *

UNITED STATES PATENT AND TRADEMARK OFFICE
CERTIFICATE OF CORRECTION

PATENT NO. : 9,841,009 B2  
APPLICATION NO. : 14/810642  
DATED : December 12, 2017  
INVENTOR(S) : Proudfoot et al.

Page 1 of 1

It is certified that error appears in the above-identified patent and that said Letters Patent is hereby corrected as shown below:

On the Title Page

Item (12) "Proudfoot" should read -- Proudfoot, et al. --.

Item (72) Inventor is corrected to read:
-- Lewis S. Proudfoot, Annandale (VA);
David E. Lee, Torrance (CA) --.

Signed and Sealed this
Twenty-ninth Day of October, 2019

Andrei Iancu
*Director of the United States Patent and Trademark Office*